Patented Aug. 1, 1944

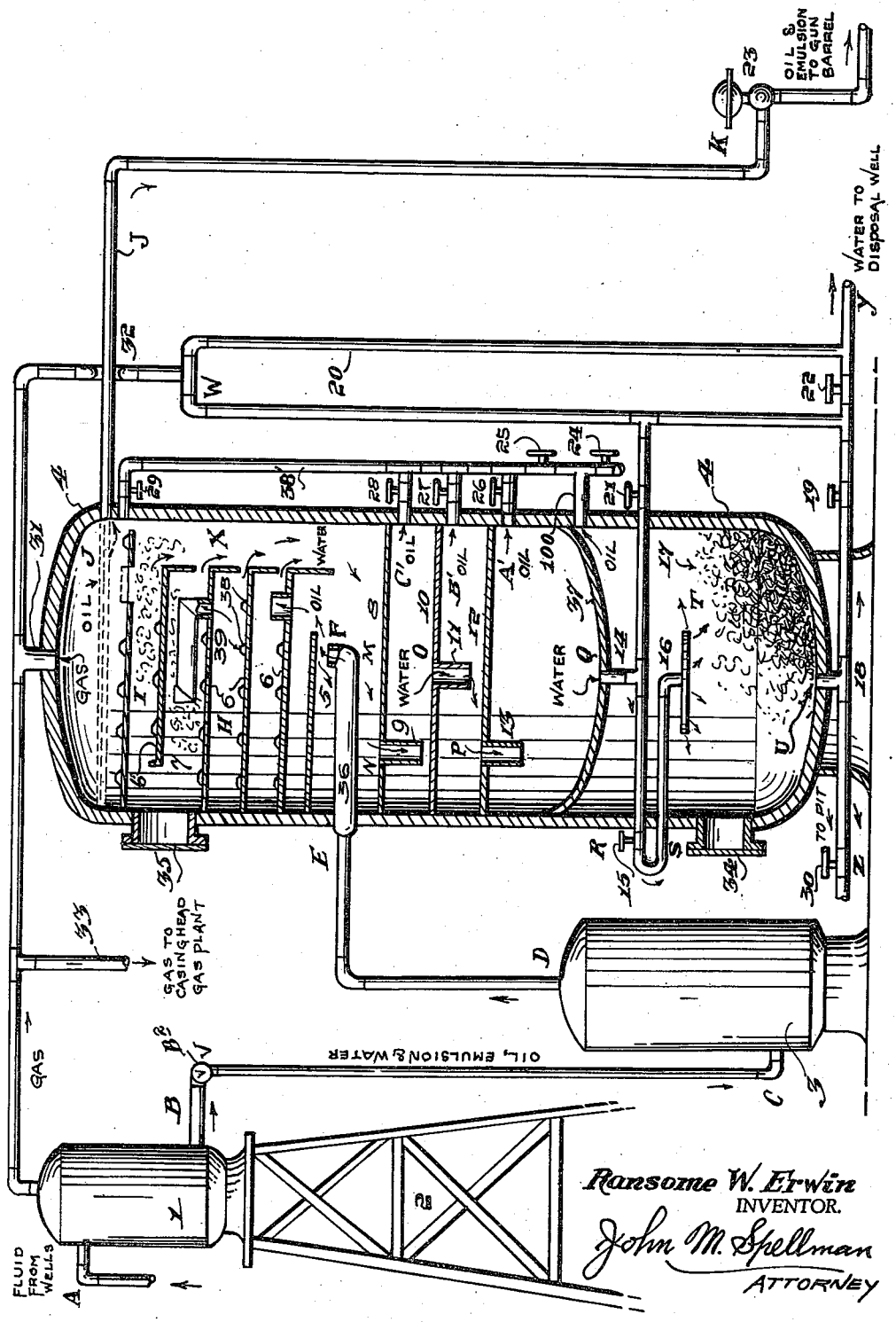

2,354,856

UNITED STATES PATENT OFFICE 2,354,856

MEANS AND METHOD FOR TREATING CRUDE OIL AND EMULSION FROM OIL WELLS

Ransome W. Erwin, Tyler, Tex., assignor to Salt Water Control, Inc.

Application June 8, 1942, Serial No. 446,194

11 Claims. (Cl. 252—346)

The invention relates to method and means for treating crude oil or emulsion from oil wells for the purpose of separating undesirable foreign matter therefrom. The improved features of the present invention may, if desired, be used in connection with a combined emulsion treating and brine injection system such as is shown in my Patent No. 2,261,057, dated Oct. 28, 1941, and the invention is in many respects in the nature of an improvement over the emulsion treating method and apparatus disclosed in that patent and in my Patent No. 2,261,101, dated Oct. 28, 1941.

One of the objects of the invention is to provide substantially complete, economical, continuous and automatic removal of water from crude oil to be treated, prior to the entrance of oil into the regular lease oil emulsion treater tank commonly known as a "gun barrel." A further object is to bring about this removal of water in a vessel whose pressure is equalized with that of the lease oil and gas separator, so as to provide equalization of pressure for the system as a whole and to provide an outlet for dissolved gases. By this means contamination of the system with oxygen is prevented, and entrained oil is salvaged from water to be cleaned for disposal or injection.

Another object of the invention is the provision in this same vessel of a separate filter chamber at the bottom which automatically removes any remaining entrained oil and finally filters any precipitated minerals from the water prior to its final disposal. Connections for this chamber are so arranged as to permit by-passage to the chamber to allow opening and inspection or cleaning out while the upper part of the vessel continues in operation.

The arrangement and construction of the apparatus and the operation thereof as embodied in this disclosure, in addition to attaining the preceding objects, provide a comparatively inexpensive pressure operated vessel ahead of any conventional lease oil emulsion treating equipment, which vessel will be small enough to prevent any formation of a general bacteria culture, this improved result being due to frequent change of water in the system and the prevention of stagnation thereby, as is quite common in the larger treating wash tanks or gun barrels.

The invention will be more readily understood by reference to the accompanying drawing, in which is set forth an illustrative embodiment of the inventive thought, it being understood that numerous modifications and variations may be resorted to without departing from the spirit of the invention.

In the drawing the single figure is a view partly in elevation and partly in section of an apparatus embodying the invention, including an oil and gas separator tank, a heater and a main dewatering tank, the latter being shown in vertical section.

In the drawing the numeral 1 denotes a suitable oil and gas separator tank which may be of any desired type, and which receives fluid from an oil well or wells through a pipe A entering near the top of the tank. The tank may be suitably supported upon a base 2 so as to occupy a relatively elevated position. From the top of the separator gas flows outwardly to a pipe line 33 which leads to a casing head gas plant. From the lower portion of the separator tank fluid from which gas has been separated flows through a lateral pipe B having a control valve V located therein, to the point $B^2$ and thence downwardly through a vertical pipe to the point C at which the fluid comprising oil, oil emulsion and water, enters the lower portion of a heater and flows upwardly through a pipe D to the point E where it enters a main treating or dewatering tank 4.

The treating tank 4 is divided into an upper oil and water separating chamber and a lower filtering chamber by means of a partition 37. The upper chamber is further subdivided into two portions, one above and the other below the point of fluid entry E. The upper portion may be termed a crude oil de-watering unit, and the portion below the entrance E but above the partition 37 may be termed a brine or water de-oiling unit, the portion of the tank below the partition 37 constituting a brine or water filtering unit.

As shown the tank 4 is provided with a lateral inlet pipe or spreader 36 which serves to spread out the oil, water and emulsion and to direct the same against the lower surface of a baffle plate 5 which serves to initially and partially separate the oil and water. The oil, together with some water and all of the emulsion, passes upwardly by gravity through a series of perforated plates 6 having upstanding teats 38, each having an opening 39 therethrough, which arrangement permits the water to work down the slope of each plate to a passageway X located beyond the down turned ends of the baffle plates in a manner more fully described in my Patents Nos. 2,261,057 and 2,261,101. This arrangement also permits the removed water to flow freely down without interference from the rising oil, whose path is confined to the perforated baffles. The oil passes upwardly into a filter compartment 7 containing excelsior, in which compartments may be located one or more additional baffles 6' which may be generally similar to the baffles 6 and provided with similar perforations. Within the excelsior zone the oil is almost completely purged of its free brine and the oily material passes out from the upper portion of the vessel 4 through the pipe J. The outgoing material consists mainly of oil and emulsion which may be further treated, if desired, in any suitable lease treating tank. A manhole 35 located near the top of the tank 4 provides a means of access to the excelsior in the upper portion of the tank, in the compartment 7, to permit cleaning and replacement of the excelsior. A valve 23 at the outlet end of pipe J permits constant removal of oil so long as pressure is applied to the vessel 4. This pressure is insured by connection with an extension from the gas line leading from the gas separator tank 1.

In the brine de-oiling zone below the inlet pipe 36 baffle plates or partitions 8, 10 and 12 are provided having down pipes 9, 11 and 13, respectively, which effect almost complete removal of any remaining oil from the brine as it passes through them. The oil removed from the brine in this zone may be constantly drawn off from the tank at points A', B' and C' through branch pipes passing through the side wall of the tank 4 connected to an upright pipe 38', and provided with control valves 26, 27 and 28, respectively. It will be noted that the entrance to each of the lateral pipes from the interior of the tank is at a point slightly below the corresponding partition or baffle plate but above the outlet of the down pipe corresponding with the particular baffle. With this arrangement it is made possible to withdraw the separated oil without carrying with it downwardly the brine. The oil passing through these lateral pipes enters the riser pipe 38', by means of which the oil is returned to the upper portion or oil section of the main emulsion treating vessel 4. A suitable control valve 29 is provided at the upper portion of the pipe 38' near the point where it enters the tank.

The brine from the de-oiling unit then passes downwardly through an outlet Q in the partition head 35 to a T 14, whence it normally passes in the direction of the arrow to an outlet R and thence through an external valve 15 and a U-curve back into the tank through an inlet S to a spreader 16 by means of which the brine is sprayed into the filter section. In this section in the area indicated at T the last trace of oil is floated out of the brine and rising to the top of the filter unit may be withdrawn from the tank through a lateral pipe 100 leading to the riser 38'. A suitable control valve 25 is provided at the lower portion of the riser 38'. In the pipe 38' the oil from the filter zone joins the oil separated from the brine in the brine de-oiling zone and passes upwardly with it into the oil zone at the top of the tank.

From the spreader 16 the brine passes downwardly through the filter section, preferably filled with excelsior 17, where all precipitated minerals are removed. The filtered brine then passes through an outlet U at the bottom of the tank 4 to a T connection 18, whence the brine normally passes to the right through a lateral pipe controlled by a valve 19 and thence up and over the water legs 20 of a siphon and back to the point Y and thence to a disposal well or the like. The lower portion of the legs 20 of the siphon may be connected by a short by-pass pipe having a normally closed valve 22 therein which, when opened, enables the brine to pass directly to the disposal well without passing over the siphon. The purpose of the siphon is to maintain a constant oil-water level within the vessel 4 and consequently to maintain a constant oil body in the upper part of the vessel, in cooperation with the oil outlet to the pipe J, the leveling of which determines the top of the oil body.

A lateral by-pass connection from the T 14 to the siphon may be provided having a normally closed valve 21 therein, which when opened permits the brine to pass direct to the water legs without flowing through the brine filter chamber. In such case valve 15 in the pipe leading to the spreader 16 is closed as well as the valve 19 in the lateral connection leading from the bottom of the filtering chamber to the siphon. There may also be provided a connection leading directly from the T 18 to a disposal pit for draining the filter chamber when such chamber is cut off from the system for cleaning or inspection. This by-pass pipe Z is provided with a normally closed control valve 30, which when opened permits the brine to flow to the pit. When the brine is being drained the bleed valve 24 is opened to the atmosphere and serves as an air vent, valve 25 being closed to cut off communication with the upper portion of the pipe 38'. A manhole opening at the lower part of the tank 4 provides for inspection, cleaning or changing the excelsior in the filter section 17.

The outlet 31 at the top of vessel 4 allows any gas separated out from the oil and emulsion to pass from the tank to the main gas line 33 leading to the casing head gas plant. A connection 32 provides a gas vent or equalizer for the siphon legs 20. Thus the gas pressure upon the brine in the siphon 20 is the same as that within the tank 4. It will be noted that all of the gas from the system will be returned to casing head gasoline plants, the gas drawn off from the tank 4 joining that initially separated from the well fluid in the separator tank 1.

In the operation of the apparatus the fluid, consisting of oil, gas, emulsion and water, as it comes from a producing well or wells first enters the oil and gas separator tank 1 at the point A. Here most of the gas is separated from the liquid portion of the fluid to be treated, the gas being taken off at the upper part of the tank and conveyed to a casing head gasoline plant, while the oil, emulsion and water pass through valve V in pipe B, and thence downwardly to the heater 3, entering the heater at the point C. The heater may be omitted in many instances where the incoming fluids contain sufficient natural heat to permit proper processing in the main tank 4. Where the heater is used the fluid leaves the tank 3 at a point D and enters the main treating tank 4 at point E, intermediate the upper oil dewatering zone and the intermediate brine de-oiling zone, through a spreader pipe 36. From the pipe 36 the entering fluid is spread out against the plate 5 at F. Here most of the water is separated out and passes down into the de-oiling zone at point M to the outlet N in the plate 8. Due to the projection of the short pipe or nipple 9 below the plate 8 a comparatively quiet area is maintained beneath the plate at C', from which the oil that separates out from the emulsion and floats upwardly can continuously flow outwardly through the branch pipe and open valve 28 to the pipe 38', passing upwardly therethrough, thence through valve 29 back into the oil section at the upper part of the main tank or vessel.

The brine, after passing through the pipe 9 into the chamber O, passes thence through pipe 11 in partition 10 and thence through pipe 13 in partition 12 as indicated by the arrow P into the lower portion of the brine de-oiling chamber, whence it passes downwardly through an opening Q in the dished partition head 31 and T pipe 14, then laterally in the direction of the arrow, through valve 15 located outside of the tank and thence back into the tank to the spreader 16 which sprays the brine into the area T. Within this area the last trace of removable oil is floated out and removed through the oil opening through the side of the tank just below the partition 37. This oil passes into the pipe 38' through the valve 25 and joins oil drawn off from the intermediate brine de-oiling zone through the valves 26, 27 and 28. The brine from which substantially all oil has been removed passes downwardly through the filtering section 17 where practically all of the precipitated minerals, such as iron, calcium and magnesium compounds, are removed and retained in the excelsior, which may be replaced periodically as required. The filtered brine then passes out from the bottom of the tank at U and normally flows through valve 19 and thence up and over one of the siphon legs 20 at W and then downwardly through the other leg to point Y and thence laterally to a suitable disposal plant.

When the section 17 becomes plugged and the excelsior contained therein requires changing, the valve 15 in the pipe leading to the spreader 16 is closed together with valves 19 and 25, while valves 21, 24 and 30 are opened. This permits the brine to flow directly through the by-pass connection and valve 21 to the siphon 20. The brine water flows through valve 21 up and over the siphon legs as usual, in this instance flowing to the pit, without having to shut down the treating system. The lower filtering chamber is then isolated and may be drained through the valve 30 to the pit, the chamber being air vented by opening the valve 24.

The main body of oil from the inlet pipe 36 passes upwardly through the baffle sections in the upper or oil de-watering zone, where part of the emulsion is broken and most of the free water is removed, such water being allowed to flow down the slope of the plates 6 between the elevated teats 39, this water then flowing uninterruptedly down the passage X beyond the down turned ends of the baffle plates. The oil then continues upwardly through the excelsior section 7 where the last traces of free water are removed, such water returning to the brine de-oiling section through the passageway X.

The oil and emulsion leave the tank at the outlet to the pipe J passing laterally and then downwardly through suitable pipes to the point K, and may then be passed through valve 23 to other lease treating equipment for final treatment of the emulsion.

Any dissolved gases weathered off in the treatment in tank 4 are removed through outlet 31. The water legs 20 which control the oily water outlet in the upper part of the tank 4 are vented by connection 32 which communicates with the gas outlet 31 at the upper part of the tank 4. In this way the oil is completely denuded of free water under separator pressure, the water is completely denuded of oil under pressure and the separated oil is continuously salvaged. The water or brine is then further filtered in the excelsior section for complete precipitate removal and is then suitable for disposal or injection into a disposal well under pressure, oxygen being completely excluded. Use of this fluid in a disposal or injection well is set forth in my Patents Nos. 2,261,057 and 2,261,101, and in my application for Flow regulation apparatus for brine injection wells, filed concurrently herewith. All of this treatment is carried out in such manner that a lease operator may retain and use all oil treating and leasing equipment that he may have already installed, thus effecting a material economy.

From the foregoing it will be apparent that the apparatus described in this invention enables an oil operator to save expense of installing closed oil treating apparatus where other types of treating equipment are already installed, and yet have a closed type of brine disposal system. The system also provides an inexpensive and economical method of processing brine to a state suitable for injection into a brine disposal well. Being of a closed type and excluding oxygen it may be constructed of common steel materials without danger of corrosion by oxygen and brine. The system also includes other advantages, as for example, where a heater is installed ahead of the treating tank 4, the latter will in many cases adequately treat the oil to pipe line specifications and enable the operator to salvage the treating plant tank or "gun barrel." The system demands little or no attention from the lease operator other than the periodic changing of the two excelsior sections 7 and 17. As compared to other methods of processing brines for injection, the cost of installation of the apparatus here disclosed is considerably less. No chemicals are used, and in instances where heat is not required ahead of the tank 4, this tank functions as a conventional water knockout ahead of the regular lease treating tank, thereby saving fuel normally used for heating same.

It will be obvious that while the disclosure presents a complete means and method for bringing about the objects enumerated, the invention is capable of changes and alterations in conformity with the inventive thought involved and such as would be within the scope and meaning of the claims appended hereto.

What I claim is:

1. A method of treating crude oil and oil emulsion in a closed chamber including an upper oil de-watering zone and a lower water de-oiling zone, which method comprises admitting fluid to be treated to the chamber at a point intermediate said zones, initially and partially separating the oil and water adjacent the entrance, passing the oil portion upwardly through the de-watering zone and the water downwardly through the de-oiling zone, further separating water from the oil in the upper zone, withdrawing the oil from the upper portion of the chamber and returning the separated water to the water de-oiling zone and combining it with the initially separated watery fluid, further de-oiling the watery fluid in the de-oiling zone, withdrawing the oil thus separated out from said de-oiling zone and returning the same to the upper portion of the oil de-watering zone and withdrawing the water from which substantially all the oil has been separated from the bottom of the chamber.

2. A method of treating crude oil and oil emulsion in a closed chamber including an upper de-watering zone and a lower water de-oiling zone, which comprises admitting fluid to be treated to the chamber at a point intermediate said zones, initially and partially separating the oil and water adjacent the entrance, passing the oil portion upwardly through the de-watering zone and the water downwardly through the de-oiling zone, further separating water from the oil in the upper zone, withdrawing the oil from the upper portion of the chamber and returning the separated water to the water de-oiling zone and combining it with the initially separated watery fluid, further de-oiling the watery fluid in the de-oiling zone, withdrawing the oil thus separated out from said de-oiling zone and returning the same to the upper portion of the oil de-watering zone and withdrawing the water from which substantially all the oil has been separated from the bottom of the chamber, said method including preheating the fluid to be treated prior to its entrance into said chamber.

3. A method of treating crude oil and oil emulsion in an upright tank including an upper de-watering zone and a lower water de-oiling zone, which comprises admitting fluid to be treated to the tank at a point intermediate said zones, initially and partially separating the oil and water adjacent the entrance, passing the oil portion upwardly through the de-watering zone and the water downwardly through the de-oiling zone, further separating water from the oil in the upper zone, withdrawing the oil from the upper portion of the tank and returning the separated water to the water de-oiling zone and combining it with the initially separated watery fluid, further de-oiling the watery fluid in the de-oiling zone, withdrawing the oil thus separated out from the tank at said de-oiling zone and returning the same to the tank at the upper portion of the oil de-watering zone and withdrawing the water from which substantially all the oil has been separated from the bottom of the tank, said method including removal of precipitated minerals from the water prior to its discharge from the tank.

4. A crude oil and emulsion treating apparatus comprising an upright tank including an upper oil de-watering zone and a lower water de-oiling zone, means for admitting fluid containing oil, emulsion and water to said tank intermediate said zones, baffle means adjacent said entrance for initially and partially separating the oil and water, means in the upper zone for further separating the water from the oil and returning the separated water to the lower zone, an oil removal pipe leading from the top of the tank, means in said de-oiling zone for separating the oil from the brine, means for withdrawing the separated oil from said de-watering zone and for returning the same to the oil zone at the top of the tank, and means at the bottom of the tank for withdrawing water from which substantially all the oil has been separated.

5. An apparatus as set forth in claim 4 wherein the water de-oiling zone includes a horizontal partition having an outlet pipe extending below the partition, and an oil draw-off pipe extending through the side wall of the tank and having its inlet below said partition but above the outlet of said outlet pipe, the oil draw-off pipe being connected to the top of the tank.

6. An apparatus as set forth in claim 4 wherein a water filtering zone is provided at the bottom of the tank for removing precipitated minerals from the water, said filtering zone being under pressure to suppress precipitation of the minerals from said water.

7. In a crude petroleum and brine disposal apparatus, the combination in a single vessel of a crude oil de-watering unit, a brine de-oiling unit and a brine filtering unit, said vessel comprising a main upright tank having a baffling and filtering zone in the upper portion thereof, an inlet below said baffling and filtering zone for entrance of liquid to be treated, and a second baffling zone beneath said entrance for removal of entrained oil from water passing through the baffles, each baffle in the lower zone including a pipe projecting downwardly therefrom, and outlets in the wall of said main tank each having a piped connection for continuous removal of the oil accumulated beneath said baffles.

8. In a crude petroleum and brine disposal apparatus, the combination in a single vessel of a crude oil de-watering unit, a brine de-oiling unit and a brine filtering unit, said vessel comprising a main upright tank having a baffling and filtering zone in the upper portion thereof, an inlet below said baffling and filtering zone for entrance of liquid to be treated, and a second baffling zone beneath said entrance for removal of entrained oil from water passing through the baffles, each baffle in the lower zone including a pipe projecting downwardly therefrom, and outlets in the wall of said main tank each having a piped connection for continuous removal of the oil accumulated beneath said baffles, said tank including a dished partition below said lower baffle zone with an opening for passage of brine, a filter chamber in the lower end of the upright tank, a spreader therein and a piped connection between the partition opening and the spreader with outside valve control, the brine being passed through the spreader to the filter chamber for final removal of oil traces and minerals.

9. A crude petroleum and brine disposal apparatus, adapted for use in connection with an oil and gas separator tank and a heater, said apparatus comprising a main tank with an opening in its wall for connection to the heater, the main tank combining the facilities of a water knock-out-filter-skimmer tank and functioning to initially treat the well product before its entrance into an oil emulsion treating apparatus; the main tank including an upper and a lower filter section, a conduit from said heater connected in said wall opening for entrance of liquid to be treated; a baffle zone above the conduit, a baffle zone below the conduit, a dished partition below the lower baffle zone, said baffle zones having piped connections with the upper portion of the main tank above the upper baffle zone for uniting the oil collected above and below the respective zones in a common head; and a conduit for carrying the oil collected to the other emulsion treating apparatus.

10. An apparatus of the character described and as claimed in claim 9, said apparatus having an area in the lower portion of the main tank defined by the space between the lower filter section and the said dished partition where the last trace of oil is removed from the fluid and a piped connection between said area and the pipe which conveys the oil from said baffle means to the oil head in the upper part of the main tank.

11. A method of treating crude oil containing a mixture of oil, water and water-oil emulsion, which comprises roughly separating the water from the mixture, passing the water downwardly to a water treating zone, and the oil and emulsion upwardly to an oil treating zone, then further separating any remaining oil from the water in the water treating zone and further separating water from the oil in the oil treating zone, withdrawing the separated oil from the water zone and combining it with the oil in the oil treating zone, and withdrawing the treated oil and emulsion from the oil treating zone to a separate chamber for further treatment.

RANSOME W. ERWIN.